United States Patent Office 3,017,355
Patented Jan. 16, 1962

3,017,355
CORROSION INHIBITOR COMPOSITION
Billy D. Oakes, Tulsa, Okla., assignor to The Dow Chemical Company, Midland, Mich., a corporation of Delaware
No Drawing. Filed Apr. 18, 1958, Ser. No. 729,241
15 Claims. (Cl. 252—8.55)

The present invention relates to inhibition of metal corrosion and more particularly it is concerned with inhibitor compositions which may be employed in acid solutions to decrease the corrosion of metal in contact with the acid solutions and which inhibitor does not deposit an organic residue on the metal surfaces.

Prior known compositions for the inhibition of corrosion of metal surfaces have in many instances employed relatively expensive chemicals. Further many of these chemicals are difficult to handle. Another disadvantage of many of the known corrosion inhibitors is that they deposit an organic residue on the metal surfaces which is undesirable in such fields as metal cleaning.

It is an object of the present invention to provide a corrosion-inhibitor composition which substantially inhibits the solubilization of metals in contact with corrosive acids. It is a further object of the present invention to provide a composition for the inhibition of corrosion of metal surfaces in contact with corrosive acids which is relatively inexpensive and easily handled. An additional object of the present invention is to provide a corrosion inhibitor composition which does not deposit an organic residue on the metal surfaces. These and other objects will become apparent from the following specification and claims directed to those skilled in the art.

It has now been found that a deposit-free, safe corrosion inhibitor can be obtained by employing a mixture of an amine and propargyl sulfide (dipropargyl sulfide). The amine-sulfide mixture substantially eliminates the deposit of organic material on the metal surface. The composition of the present invention consists essentially of from 10 percent to 90 percent by volume of amine and 90 to 10 percent by volume of propargyl sulfide. Good results are obtained when the inhibitor composition is employed in concentrations of from 0.05 to 2.0 percent by volume.

Substantially any amines can be employed in accordance with the present invention as, for example, pyridine, the alkylpyridines and mixtures thereof, such as a mixture of high-boiling tertiary-nitrogen heterocyclic compounds having an equivalent weight of approximately 170 (alkylpyridine HB), 2-n-amylpyridine, amylamine, diamylamine, trihexylamine, butylamine, and the like.

In accordance with the present invention, the amine and the propargyl sulfide are mixed with an aqueous acid solution or with water which is thereafter mixed with the acid. It is preferable to employ a surfactant with the sulfide and amine. Oftentimes it is desirable to employ a salt of the amine. In one manner of carrying out the present invention the sulfide, amine and surfactant are mixed with water, the resulting mixture agitated to assure complete distribution of the additives in the aqueous phase, and the desired mineral acid mixed with this aqueous mixture to obtain an inhibited acid suitable for use in oil-well acidizing or industrial acid-cleaning.

Various types of surfactants have been found to be effective and useful in assuring the complete dispersion of the active ingredients throughout the composition. Thus for example one may employ an ionic or nonionic surface-active dispensing agent, such as the condensation product of the di-sec-butyl-phenols with ethylene oxides (from 10 to 30 moles), the ammonium isopropylbenzene-para-sulfonates, the dioctyl sodium sulfosuccinates, or the trimethylstearylammonium chlorides.

Various acids, particularly the mineral acids, have been found to be effectively inhibited against metal corrosion by the employment of the compositions of the present invention. Thus, sulfuric, phosphoric, acetic and hydrochloric acids and the like may be effectively inhibited when employing a propargyl sulfide in combination with an amine.

The inhibitors of the present invention are operable when employed at temperatures as high as about 27.5° C. Above this temperature, while some inhibition is found to exist, the corrosion rate is above that which is permissible in field operations both economically and safetywise.

The following examples illustrate the present invention but are not to be construed as limiting.

*Example 1*

561 gallons of water, placed in a 1,000 gallon tank provided with an air lance was mixed with 1 gallon the product obtained by the condensation of di-sec-butyl-phenol with 10 moles of ethylene oxides, 2 gallons of alkylpyridines HB (a mixture of high-boiling alkylpyridines with an equivalent weight of approximately 170, obtained from Carbide and Carbon Chemicals Company) and 2 gallons of dipropargyl sulfide. The resulting mixture was agitated with the aid lance for approximately 15 minutes. Thereafter, continuing the agitation, 434 gallons of 32 percent hydrochloric acid was added to the mixture. The resulting mixture, 1,000 gallons, was an inhibited 15 percent hydrochloric acid solution which was useful as an oil-well acidizing solution.

*Examples 2–8*

Various inhibitor compositions were prepared from an alkylpyridine and propargyl sulfide and employed to inhibit 15 percent hydrochloric acid. The tests were run at 150° F. for 16 hours. The test metal was AISI 1010 mild steel coupons 2¾ inches by 1 inch by 0.12 inch. The results of such tests are tabulated in the table below.

| Ex. No. | Concentration Inhibitor (percent by volume) | Corrosion Rate (lbs/ft²/day) |
|---|---|---|
| 2 | 0.4 percent alkylpyridines HB (Coded HB) | 0.18 |
| 3 | 0.4 percent dipropargyl sulfide (Coded PS) | [1] 0.0086 |
| 4 | 0.4 percent mixture (9 parts by volume HB+1 part) PS). | [2] 0.052 |
| 5 | 0.4 percent mixture (7 parts HB+3 parts PS) | [2] 0.030 |
| 6 | 0.4 percent mixture (5 parts HB+5 parts PS) | [2] 0.021 |
| 7 | 0.4 percent mixture (3 parts HB+7 parts PS) | [2] 0.018 |
| 8 | 0.4 percent mixture (1 parts HB+9 parts PS) | [2] 0.0057 |

[1] Heavy yellow deposit found on coupon.
[2] No deposit on coupon.

*Examples 9–14*

The effects of various wetting agents were determined in a similar manner employing the inhibitor at a concentration of 0.3 percent by volume. The inhibitor had a composition of 1 part by volume of propargyl sulfide and 1 part by volume of alkylpyridines HB. The tests were run at a temperature of 200° F. for 16 hours. The test metal was AISI 1010 mild steel. The results of the employment of various types of wetting agents are tabulated in the following table.

| Ex. No. | Concentration Wetting Agent Added (percent by volume) | Ionic Activity | Corrosion Rate (lbs/ft²/day) |
|---|---|---|---|
| 9 | none | | 0.025 |
| 10 | 0.1 percent di-sec-butylphenol condensed with 10 moles ethylene oxide. | Nonionic | 0.022 |
| 11 | 0.1 percent nonylphenol condensed with 15 moles ethylene oxide. | do | 0.023 |
| 12 | 0.1 percent ammonium isopropyl-benzene-para-sulfonate. | Anionic | 0.027 |
| 13 | 0.1 percent dioctyl sodium sulfosuccinate. | do | 0.019 |
| 14 | 0.1 percent trimethylstearylammonium chloride. | Cationic | 0.024 |

*Examples 15–20*

The following tests were run to determine the synergistic effect of various amines. 15 percent hydrochloric acid heated to 200° F. and containing one of the inhibitor compositions listed below was employed to determine the effect of the inhibitor on APIN 80 tubing (1 inch wide quarter-segment of 2.375 inches outside diameter tubing having a wall thickness of 0.187 inch). The results of such tests are tabulated below:

| Ex. No. | Concentration Inhibitor (percent by volume) | Corrosion Rate (lbs/ft²/day) |
|---|---|---|
| 15 | 0.4 percent di-isoamyl amine | 0.23 |
| 16 | 0.4 percent mixture of 1 part di-isoamylamine + 1 part by volume propargyl sulfide. | 0.030 |
| 17 | 0.4 percent 2-n-amylpyridine | 0.25 |
| 18 | 0.4 percent mixture 1 part 2-n-amylpyridine + 1 part propargyl sulfide. | 0.012 |
| 19 | 0.4 percent tri-n-amyl amine | 0.16 |
| 20 | 0.4 percent of 1 part tri-n-amyl amine + 1 part of propargyl sulfide. | 0.0085 |

*Examples 21–26*

Employing various acids to determine the effectiveness of the inhibitor compositions at 150° F. and 16 hours on AISI 1010 mild steel, the following results were obtained.

| Ex. No. | Acid Media | Inhibitor Concentration (percent by volume) | Corrosion Rate (lbs./ft.²/day) |
|---|---|---|---|
| 21 | 5 percent Sulfuric | None | 0.21 |
| 22 | do | 0.4 percent Formulation A¹ | 0.00054 |
| 23 | 5 percent Phosphoric | None | 0.14 |
| 24 | do | 0.4 percent Formulation A | 0.00070 |
| 25 | 5 percent Acetic | None | 0.019 |
| 26 | do | 0.4 percent Formulation A | 0.00044 |

¹ Formulation A—1 part by volume of propargyl sulfide +1 part by volume of Alkylpyridines HB.

I claim:
1. A metal corrosion inhibitor for use in aqueous acid solutions which comprises a mixture consisting of from 10 to 90 percent by volume of propargyl sulfide and from 90 to 10 percent by volume of an amine selected from the group consisting of alkylamines having from 2 to 18 carbon atoms, inclusive, and alkyl pyridines.

2. A metal corrosion inhibitor as defined in claim 1 wherein the amine is an alkyl pyridine.

3. A metal corrosion inhibitor as defined in claim 1 wherein the amine is an alkylamine.

4. A metal corrosion inhibitor as defined in claim 1 wherein the amine is 2-n-amylamine.

5. A metal corrosion inhibitor as defined in claim 1 wherein the amine is di-isoamylamine.

6. A metal corrosion inhibitor as defined in claim 1 wherein the amine is tri-n-amylamine.

7. A metal corrosion inhibitor as defined in claim 1 which comprises in addition about 10 to 50 percent by volume of a surface active agent stable in acid medium.

8. A metal corrosion inhibitor as defined in claim 7 wherein the surface active agent is an ionic surface active agent.

9. A metal corrosion inhibitor as defined in claim 7 wherein the surface active agent is a non-ionic surface active agent.

10. A metal corrosion inhibitor as defined in claim 7 wherein the surface active agent is a di-sec.-butyl phenyl condensed with ethylene oxide.

11. A metal corrosion inhibitor as defined in claim 7 wherein the surface active agent is an isopropylbenzene sulfonate.

12. A metal corrosion inhibitor as defined in claim 7 wherein the surface active agent is an alkyl sulfosuccinate.

13. A metal corrosion inhibitor as defined in claim 7 wherein the surface active agent is a tetraalkylammonium halide.

14. A corrosion-inhibited acid composition comprising an aqueous solution of an acid and from 0.05 to 1.0 percent by volume of a mixture consisting of from 9 to 1 parts by volume of propargyl sulfide, from 1 to 9 parts by volume of an amine selected from the group consisting of alkylamines having from 2 to 18 carbon atoms, inclusive, and alkyl pyridines.

15. A corrosion-inhibited acid composition comprising an aqueous solution of an acid, from 0 to 2 percent by volume of a surface active agent, from 0.005 to 1.0 percent each of propargyl sulfide and an amine selected from the group consisting of alkylamines having from 2 to 18 carbon atoms, inclusive, and alkyl pyridines.

References Cited in the file of this patent

UNITED STATES PATENTS

| | | |
|---|---|---|
| 2,053,024 | Dreyfus | Sept. 1, 1936 |
| 2,472,400 | Bond et al. | June 7, 1949 |
| 2,499,283 | Robinson | Feb. 28, 1950 |
| 2,814,593 | Beiswanger et al. | Nov. 26, 1957 |
| 2,880,180 | Foster et al. | Mar. 31, 1959 |

OTHER REFERENCES

Ito: Tar Base as Corrosion Inhibitor, article in Chemical Abstracts, vol. 50, 1956, pp. 16632 and 16633.